May 22, 1923.
R. CRANE
ATOMIZING OIL BURNER
Filed April 10, 1922
1,456,266
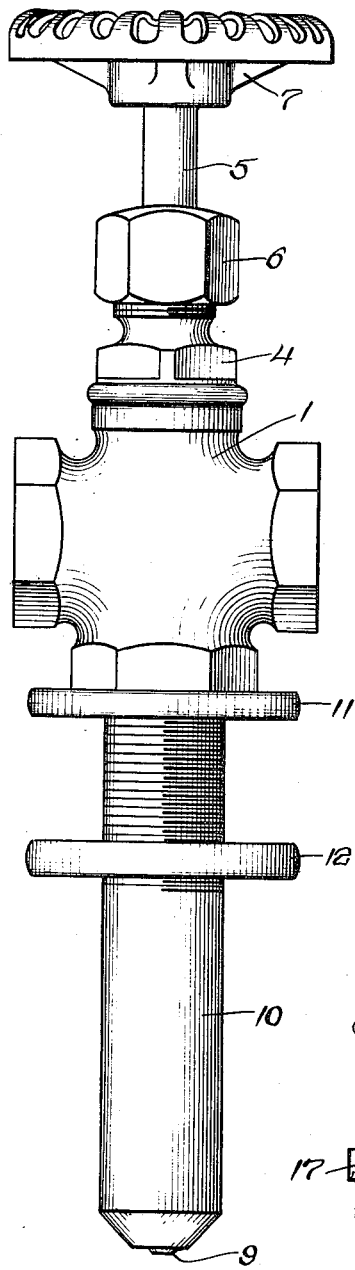
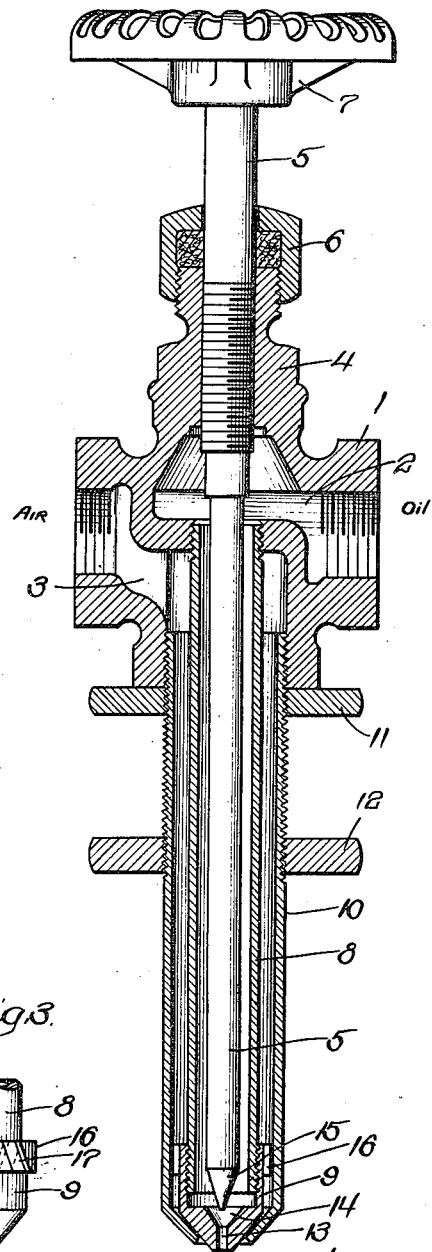
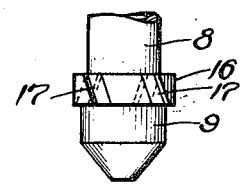
Inventor:
Ryerson Crane
By Foree Bain + Hinkle
Attys Patented May 22, 1923.

1,456,266

UNITED STATES PATENT OFFICE.

RYERSON CRANE, OF CHICAGO, ILLINOIS, ASSIGNOR TO RYERSON CRANE, INC., A CORPORATION OF ILLINOIS.

ATOMIZING OIL BURNER.

Application filed April 10, 1922. Serial No. 551,021.

*To all whom it may concern:*

Be it known that I, RYERSON CRANE, a citizen of the United States, residing at Chicago, in the county of Cook and State of Illinois, have invented certain new and useful Improvements in Atomizing Oil Burners, of which the following is a specification.

This invention relates to atomizing oil burners.

One of the objects of the invention is to provide an improved oil burner.

Another object is to provide an improved oil atomizer.

Another object is to provide an atomizer of simple and inexpensive construction.

Another object is to provide an atomizer wherein the flow of air and fuel may be readily regulated.

Other objects and advantages will hereinafter appear.

An embodiment of the invention is illustrated in the accompanying drawing, wherein—

Fig. 1 is a side elevation of an atomizing oil burner.

Fig. 2 is a longitudinal cross section thereof, and

Fig. 3 is a side elevation of the oil nozzle.

The burner has a valve casing 1. The casing of an ordinary globe valve may be used. Casing 1 has an oil inlet chamber 2 and an air inlet chamber 3. Chamber 2 is adapted for screw threaded connection to a pipe leading to a suitable oil reservoir. Chamber 3 is adapted for screw threaded connection to a pipe leading to a suitable source of air under pressure. Casing 1 has an internally threaded valve rod stem 4 through which a threaded valve rod 5 passes. A packing nut 6, threading upon the end of stem 4, serves to maintain a tight joint about rod 5. A hand wheel 7 serves as a means for turning the valve rod.

A tube 8 of somewhat larger internal diameter than the external diameter of valve rod 5 is externally threaded at one one end to be threaded into an opening in casing 1 which communicates with oil inlet chamber 2. The other end of tube 8 is externally threaded to receive a threaded oil nozzle 9.

A coaxial outer tube 10 of somewhat larger internal diameter than the external diameter of tube 8 is externally threaded at one end to be threaded into an opening in casing 1 which communicates with air inlet chamber 3. A pair of nuts 11 and 12 threading upon tube 10 may be used to regulate the burner as will be hereinafter described.

Oil nozzle 9 has a restricted discharge opening 13 through its front end. Back of opening 13 is a tapering valve seat 14. The end of valve rod 5 is tapered to form a valve 15 which fits seat 14 and to close the nozzle against the flow of oil. The quantity of oil allowed to pass through discharge opening 13 is controlled by the amount of separation between valve 15 and seat 14. The turning of hand wheel 7 varies this separation and closes the nozzle.

The front end of oil nozzle 9 is externally tapered and the front end of tube 10 is also tapered to form an air nozzle around the oil nozzle. These tapers may be made on slightly different angles so that the space between the outer tube and the oil nozzle tapers convergingly toward the open end.

An annular flange 16 on the rear end of oil nozzle 9 substantially fits the bore of outer tube 10. Flange 16 has a series of grooves 17 extending therethrough. These grooves may pass through the flange at an angle or on a spiral so that the air in passing therethrough is given a rotary or whirling movement.

Air passes from chamber 3 through the passage between tubes 8 and 10 and through the grooves in flange 16 out around the end of oil nozzle 9 in the form of a whirl. Oil passes from chamber 2 through the passage between tube 8 and rod 5 out of opening 13 in oil nozzle 9. The oil emerging from oil nozzle 9 is caught up by the whirling stream of air and thoroughly atomized and mixed with the air.

Because of the fact that the air passage between tubes 8 and 10 and the oil passage between tube 8 and rod 5 are relatively of much greater area substantially throughout their lengths than the restricted discharge openings at the front end of the burner there is a substantially unreduced pressure of oil and air at the discharge end of the burner.

The flow of oil may be varied and completely shut off by the manipulation of hand wheel 7. The flow of air may be controlled by threading outer tube 10 to a greater or less extent into casing 1 and thereby varying the area of the air outlet between the tapering ends of nozzle 9 and outer tube 10.

The outer tube may be turned by nut 12 which is rigidly connected thereto and may be locked in any adjusted position by turning nut 11 tightly against casing 1. The burner may be taken apart readily for inspection, cleaning and repairing.

Having described my invention what I claim as new and desire to secure by Letters Patent, is:—

An oil burner comprising a casing having two threaded aligning openings, one on each side, to admit air and oil respectively; a cross wall within the casing separating the two openings; said casing having two other aligning openings thru its ends at right angles to the air and oil openings; an oil conducting pipe extending thru the cross wall into the oil opening; an axially adjustable air pipe having a port at its outer end and overlying the oil pipe extending into the casing thru an end opening and communicating with the air opening, a check nut on said air pipe to hold it in adjusted position and a valve stem threaded into the other end opening aligning with the air and oil pipes and extending into the oil pipe, having a valve on its inner end to close a nozzle at the end of the oil pipe operating as a valve for the discharge end of the air pipe and a nozzle at the outer end of the air pipe containing a port cooperating with the nozzle of the oil pipe.

In testimony whereof I hereunto subscribed my name.

RYERSON CRANE.